US007825979B2

(12) United States Patent
Yoshino et al.

(10) Patent No.: US 7,825,979 B2
(45) Date of Patent: Nov. 2, 2010

(54) DISPLAY CONTROL APPARATUS AND DISPLAY CONTROL METHOD

(75) Inventors: Hiroaki Yoshino, Kawasaki (JP); Yuichi Nakase, Meguro-ku (JP)

(73) Assignee: Canon Kabushiki Kaisha, Tokyo (JP)

( * ) Notice: Subject to any disclaimer, the term of this patent is extended or adjusted under 35 U.S.C. 154(b) by 1395 days.

(21) Appl. No.: 11/268,269

(22) Filed: Nov. 7, 2005

(65) Prior Publication Data

US 2006/0098110 A1 May 11, 2006

(30) Foreign Application Priority Data

Nov. 8, 2004 (JP) .......................... 2004-324074
Oct. 4, 2005 (JP) .......................... 2005-291293

(51) Int. Cl.
*H04N 5/222* (2006.01)

(52) U.S. Cl. .......................... 348/333.05; 348/333.11

(58) Field of Classification Search .................... None
See application file for complete search history.

(56) References Cited

U.S. PATENT DOCUMENTS 6,819,356 B1 * 11/2004 Yumoto ................. 348/231.2
7,171,113 B2 * 1/2007 Parulski et al. ............ 396/287
2002/0018135 A1 * 2/2002 Amano ................ 348/333.01
2003/0112357 A1 * 6/2003 Anderson ............ 348/333.05
2003/0146938 A1 * 8/2003 Geiger ..................... 345/784

FOREIGN PATENT DOCUMENTS

JP 11-177911 A 7/1999
JP 2003-224752 A 8/2003

* cited by examiner

*Primary Examiner*—Jason Whipkey
*Assistant Examiner*—Dennis Hogue
(74) *Attorney, Agent, or Firm*—Canon U.S.A. Inc., I.P. Division

(57) ABSTRACT

The present invention reads the image recorded in a recording medium, and displays the read image in a display unit. In a case where a changeover instruction to change the display image to the next image is continuously detected, the reading of the image by a reading unit and a display by the display unit are performed in order, and a display at the display unit is changed depending on whether or not the read image satisfies a predetermined condition.

8 Claims, 6 Drawing Sheets

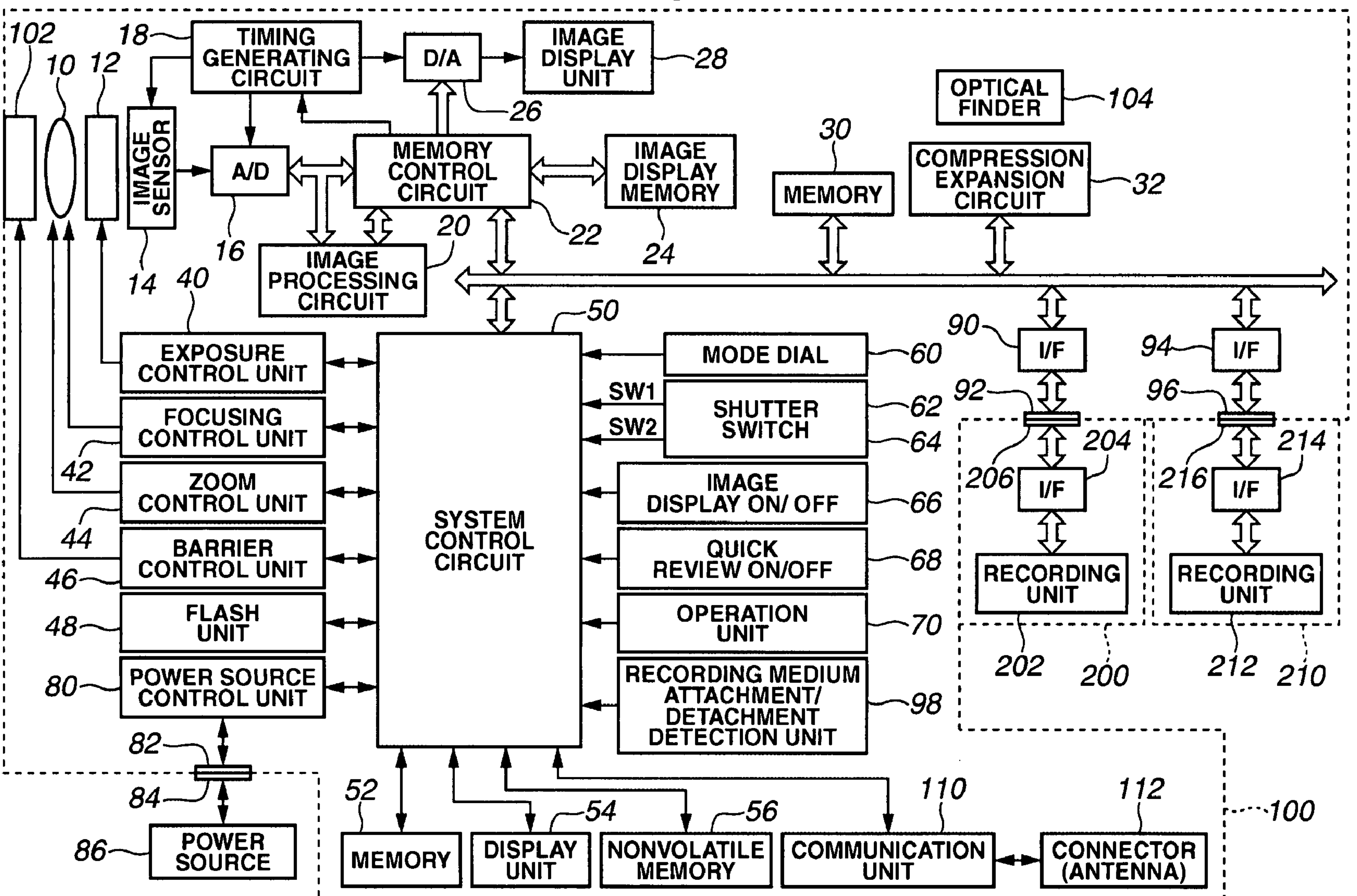
FIG.1
TIMING GENERATING CIRCUIT
D/A
IMAGE DISPLAY UNIT
OPTICAL FINDER
IMAGE SENSOR
A/D
MEMORY CONTROL CIRCUIT
IMAGE DISPLAY MEMORY
MEMORY
COMPRESSION EXPANSION CIRCUIT
IMAGE PROCESSING CIRCUIT
EXPOSURE CONTROL UNIT
FOCUSING CONTROL UNIT
ZOOM CONTROL UNIT
BARRIER CONTROL UNIT
FLASH UNIT
POWER SOURCE CONTROL UNIT
SYSTEM CONTROL CIRCUIT
MODE DIAL
SW1
SW2
SHUTTER SWITCH
IMAGE DISPLAY ON/ OFF
QUICK REVIEW ON/OFF
OPERATION UNIT
RECORDING MEDIUM ATTACHMENT/ DETACHMENT DETECTION UNIT
I/F
I/F
I/F
I/F
RECORDING UNIT
RECORDING UNIT
POWER SOURCE
MEMORY
DISPLAY UNIT
NONVOLATILE MEMORY
COMMUNICATION UNIT
CONNECTOR (ANTENNA)
102
10
12
18
28
26
104
30
32
14
16
20
22
24
40
50
42
44
46
48
80
82
84
86
52
54
56
110
112
100
60
62
64
66
68
70
98
90
92
94
96
204
206
214
216
202
200
212
210

DISPLAY CONTROL APPARATUS AND DISPLAY CONTROL METHOD

BACKGROUND OF THE INVENTION

1. Field of the Invention

The present invention relates to a display control apparatus and a display control method, and in particular, relates to a display control apparatus and a display control method for displaying a still image and a moving image.

2. Description of the Related Art

Conventionally, there has been on the market a recording and reproducing device such as an electronic camera which records and reproduces a still image and a moving image with a memory card having a solid storage device as a recording medium. Among these devices, there have been available those including an electronic finder using a display unit such as a color liquid crystal panel.

In the electronic camera including the electronic finder, since an image before photographing is continuously displayed in the electronic finder, it is possible for a user of the electronic camera to decide an image composition. Further, since the captured image can be played back and displayed in the display unit of the electronic finder, it is possible to confirm the captured image.

As the performance of the electronic camera improves, particularly along with the increase in the number of pixels of an image sensor, a data amount employed for each captured image has been increased. Against such a background, a memory card having a large capacity has been developed, and depending on photographing conditions, it has become possible to store a large amount of images exceeding a thousand sheets in a portion of memory card.

Although the number of images recorded in the memory card is so large, it is possible for the user to see all the recorded images using a reproducing function of the electronic camera. However, when the number of sheets becomes so large to the extent of several hundreds, the time and trouble for finding out the image which the user desires to see also becomes great.

In order to solve such a problem, there have been proposed reproducing methods for finding a desired image from a large amount of captured images at high speed. For example, Japanese Patent Application Laid-Open No. 11-177911 discloses a digital camera having a function to perform a page advancing at high speed in displaying the captured image. This digital camera monitors whether or not the page advancing is a continuous page advancing operation. In a case of the continuous page advancing operation, a state of the operation is divided into several stages, and the content to be displayed for each stage is changed according to the state. This makes it easy for a user to visibly grasp the display content even during the continuous page advancing.

Further, Japanese Patent Application Laid-Open No. 2003-224752 discloses a digital camera having a continuous shooting function in which the captured images can be reproduced at the time intervals at which the photographing was performed.

However, basically the high speed page advancing is only a function to achieve the speedup in reproducing the captured image one by one in order at a constant speed, and fundamentally it is not different from the conventional method. Further, there is a method of displaying plural images within a single screen. However, it does not always have good usability since displayed information for each image becomes limited.

SUMMARY OF THE INVENTION

The present invention is directed to a display control apparatus and a display control method which can easily find a desired image even if a large amount of images are recorded.

According to one aspect of the present invention, there is provided a display control apparatus, including: a reading unit configured to read an image recorded in a recording medium; a display unit configured to display the read image; an instruction detection unit configured to detect a changeover instruction to change the displayed image to the next image; and a control unit. In a case in which the instruction detection unit continuously detects the changeover instruction, the reading of the image by the reading unit and the display by the display unit are performed in order, and at the same time, the display performed by the display unit is changed depending on whether or not the read image satisfies a predetermined condition.

Further, the present invention is directed to a display control apparatus and a display control method, with which a desired image can be easily found, even while performing an image feeding display.

In accordance with another aspect of the present invention, there is provided a display control apparatus, including: a display unit configured to display the image recorded in the recording medium; and a control unit configured to control the display unit so that, at the display unit, among plural images, the display time of an image satisfying a predetermined condition becomes longer than the display time of an image not satisfying the predetermined condition when the display unit performs the display feeding display of plural images.

Further, the present invention is aimed at a display control apparatus and a display control method, with which a desired image can be easily found even in case of performing a linear image retrieval.

In accordance with another aspect of the present invention, there is provided a display control apparatus, including: a determining unit configured to read in order plural images recorded in a recording medium and determine whether each read image accords with the condition of the retrieval key; and control unit configured to control a display unit so as to display the read image at least for a first period of time when it is determined that the image read by the determining unit is not an image matching the retrieval key condition and to control the display unit so as to display the read image for a second period of time longer than the first period of time when it is determined that the image read by the determining unit is an image matching the retrieval key condition.

Further features of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 1 a block diagram showing a structural example of a digital camera as an image processing apparatus according to a first embodiment of the present invention.

DETAILED DESCRIPTION OF THE EMBODIMENTS

Figure 2:
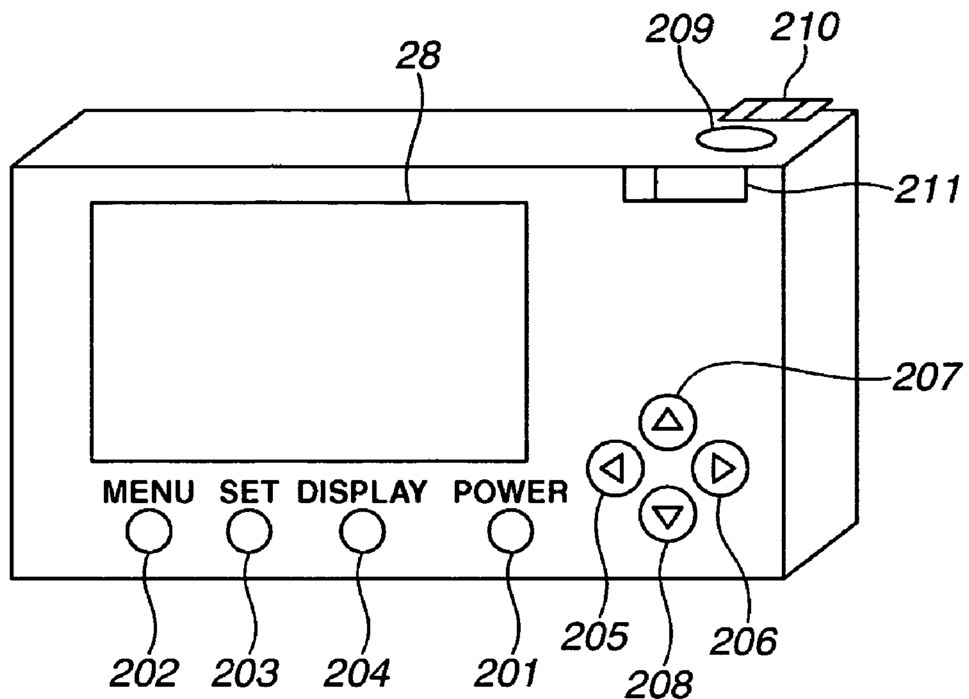
FIG. 2 is a perspective view showing an exemplary appearance of the digital camera of FIG. 1.

Exemplary Embodiments of the present invention will be described in detail below with reference to the drawings.

First Embodiment

FIG. 1 is a view showing a structural example of a digital camera 100, which implements a display control apparatus and a display control method according to a first embodiment of the present invention. The digital camera 100 has an image capture lens 10, a shutter 12 including a diaphragm function, and an image sensor 14 such as a CCD (charge-coupled device) or CMOS (complementary metal-oxide semiconductor) sensor, which converts an optical image into an electrical signal. Further, the digital camera 100 has an A/D (analog-to-digital) converter 16 which converts the analog signal output from the image sensor 14 into a digital signal, and obtains the captured image as a digital data.

A timing generating circuit 18 supplies a clock signal and a control signal to the image sensor 14, an A/D converter 16, and a D/A (digital-to-analog) converter 26, and is controlled by a memory control circuit 22 and a system control circuit 50.

An image processing circuit 20 performs predetermined pixel interpolating processing or color conversion processing to the data received from the A/D converter 16 or the data received from the memory control circuit 22. Further, the image processing circuit 20 performs a predetermined calculation using the captured image data, and based on the calculation result, the system control circuit 50 performs a control of an exposure control unit 40 and a focusing control unit 42. That is, the image processing circuit 20 performs an AF (auto focus) processing, an AE (auto exposure) processing, and an EF (preliminary flash light emission) processing of a TTL (through the lens) system.

Further, in the image processing circuit 20, a predetermined calculation is performed using the captured image data, and based on the calculation result, the AWB (auto white balance) processing of the TTL system is also performed.

The memory control circuit 22 controls the A/D converter 16, the timing generating circuit 18, the image processing circuit 20, an image display memory 24, the D/A converter 26, a memory 30, and a compression expansion circuit 32.

The data of the A/D converter 16 is written in the image display memory 24 or the memory 30 through the image processing circuit 20 and the memory control circuit 22, or directly through the memory control circuit 22.

The display image data written in the image display memory 24 is displayed by an image display unit 28 such as a liquid crystal display (LCD) or organic electroluminescent (EL) display through the D/A converter 26. By displaying captured image data in the image display unit 28 one after another, an electronic finder function can be realized.

Further, the image display unit 28 can turn on and off the display according to the instruction of the system control circuit 50, and in the case where the display is turned off, the power consumption of the digital camera 100 is substantially reduced.

The memory 30 is a storage device to store captured still images or moving images, and provides a sufficient storage capacity to store a predetermined number of sheets of the still image or a predetermined period of time of the moving image. Accordingly, in the case of continuously shooting plural sheets of still image or panoramic photographing, it is possible to write a large amount of images at high speed in the memory 30. Further, it is also possible to use the memory 30 as a working region of the system control circuit 50.

The compression expansion circuit 32 reads the image stored in the memory 30, and performs a known processing of data compression or expansion using an adaptive discrete cosine transformation (ADCT), a wavelet transformation, and the like, and writes into the memory 30 the data with which the processing is finished. The exposure control unit 40 controls the shutter 12 having an aperture function, and also controls a flash light amount in collaboration with a flash unit 48.

The focusing control unit 42 controls focusing of the image capture lens 10, and a zoom control unit 44 controls zooming of the image capture lens 10. A barrier control unit 46 controls the operation of a protection unit 102, which is a lens barrier to protect the image capture lens 10. The flash unit 48 functions as an auxiliary light source at the time of photographing, and also has a light amount control function. It has also a function of projecting an AF auxiliary light.

The exposure control unit 40 and the focusing control unit 42 are controlled using the TTL system, and based on the result of calculating the captured image data by the image processing circuit 20, the system control circuit 50 governs the exposure control unit 40 and the focusing control unit 42. The system control circuit 50 is, for example, a central processing unit (CPU), and controls the digital camera 100 executing a program stored in a memory 52. The memory 52 stores constants, variables, a program and the like for operating the system control circuit 50.

The display unit 54 is, for example, configured of a combination of output devices such as an LCD, a light emitting diode (LED), a speaker, and the like, and outputs an operational state, a message, and the like using a character, an image, a voice, and the like according to the program executed at the system control circuit 50. The single or plural display units 54 are disposed at a position that provides good viewability in the vicinity of the operation unit 70 of the digital camera 100. Further, a portion of the display unit 54 is disposed within an optical finder 104.

The display contents of the display unit 54 include, for example, a single shot/continuous shooting display, a self-timer display, a compression ratio display, a display of the number of recorded images, a display of the number of recorded sheets, and a display of the remaining number for photographing. Further, there are a shutter speed display, an aperture value display, an exposure correction display, a flash display, a red-eye reduction display, and a macro photographing display. Further, there are a buzzer setting display, a display of remaining clock battery amount, a display of remaining battery amount, an error display, and an information display with plural digits. Further, there are a display of detachment/attachment state of recording medium 200 and 210, a display of communication I/F operation, a date and time display, and a display of a connection state with an external computer. Further, there are an in-focus display, a display showing completion of photographing preparation, a camera-shake warning display, a flash charging display, a display of writing operation in recording medium, and the like. Portions of these displays are displayed within the optical finder 104.

A nonvolatile memory 56 is a memory which is electrically erasable and recordable, for example, an electrically erasable programmable read-only memory (EEPROM).

The digital camera 100 includes a mode dial 60, shutter switches 62 and 64, an image display ON/OFF switch 66, a quick review ON/OFF switch 68, and the operation unit 70. These component elements constitute operation units to input various operation instructions to the system control circuit 50. The operation units are configured of a combination of a single or plural buttons, switches, dials, touch panels, a pointing by detection of the line of vision, voices recognition device, and the like.

Now, a specific description is given about these operation units. The mode dial switch 60 sets a changeover of various modes such as a power source off, an automatic photographing mode, a photographing mode, a panoramic photographing mode, a reproducing mode, a multi screen reproducing and erasing mode, or a PC (personal computer) connection mode.

A first shutter switch SW1 62 is turned on in the midst of an operation (half depression) of the shutter button (not shown) provided in the digital camera 100. At this time, the first shutter switch SW1 62 gives an instruction to start a series of operations such as AF (auto focus) processing, AE (auto exposure) processing, AWB (auto white balance) processing, or EF (preliminary flash light emission) processing.

A second shutter switch SW2 64 is turned on when the operation of a shutter button (not shown) is completed (full depression). At this time, the second shutter switch SW2 64 gives an instruction to start a series of operations such as exposure processing, developing processing, and recording processing. The digital camera, according to this instruction, performs the exposure processing to write the signal read from the image sensor 14 in the memory 30 as an image data through the A/D converter 16 and the memory control circuit 22. Next, the developing processing is performed making calculation at the image processing circuit 20 and the memory control circuit 22. Then, the image data is read from the memory 30, and is compressed at the compression expansion circuit 32, and the recording processing to write this image data in the recording medium 200 or 210 is performed.

The image display ON/OFF switch 66 sets ON/OFF of the image display unit 28. When the photographing is performed using the optical finder 104, the display of the image display unit 28 including, for example, a thin film transistor (TFT), or an LCD can be turned off so as to shut off the power supply, thus making it possible to reduce power consumption.

The quick review ON/OFF switch 68 selects a quick review function to automatically reproduce the captured image data immediately after the photographing. The present embodiment is particularly provided with a function to set up a quick review in the case where the image display unit 28 is turned off.

The operation unit 70 includes various buttons, touch panels, and the like. The buttons include a menu button, a setting button, a macro button, a page advancing button for multi screen reproducing, and a single shooting and continuous shooting/self-timer changeover button. Further, a menu moving +(plus) button, a menu moving −(minus) button, and a reproduced image moving +(plus) button, a reproduced image moving −(minus) button are available. Also available are a photographic image quality selecting button, an exposure correction button, a date/hour setting button, a compression mode switch, and the like.

The compression mode switch selects the compression ratio of a JPEG (Joint Photographic Expert Group) compression or selects a RAW mode in which the signal of the image sensor is digitalized as it is, and recorded in the recording medium.

In the present embodiment, as the JPEG compression mode, a normal mode and a fine mode are provided as an example. A user of the digital camera 100 can perform photographing by selecting the normal mode in case of attaching importance to the data size of the captured image, and select the fine mode in case of attaching importance to the quality of the captured image.

In the JPEG compression mode, the compression expansion circuit 32 reads the image data written in the memory 30, and after having compressed the image data to a set compression ratio, records the data, for example, in the recording medium 200. In the RAW mode, according to the pixel array of the color filter of the image sensor 14, the image data is read as it is by each line, and the image data written in the memory 30 is read through the A/D converter 16 and the memory control circuit 22, and is recorded in the recording medium 200.

A power source control unit 80 is configured of a battery detection circuit, a DC-DC converter, a switch circuit to change a block to be energized, and the like, and performs detection of the presence or absence of an installed battery, a type of battery, and the remaining amount of battery energy. Further, based on the detection result and the instruction of the system control circuit 50, a power source control unit 80 controls the DC-DC converter, and supplies the required voltage to each unit including the recording medium for a required period of time.

A power source 86 includes a primary battery such as an alkaline battery, or a lithium battery, a secondary battery such as a NiCd battery, a NiMH battery, or a Li battery or AC adapter and the like, and is attached to the digital camera 100 by connectors 82 and 84.

The recording mediums 200 and 210 such as a memory card and a hard disc have recording units 202 and 212, respectively, configured of a semiconductor memory, a magnetic disc, and the like, interfaces 204 and 214 with the digital camera 100, and connectors 206 and 216, respectively. The recording mediums 200 and 210 are mounted on the camera 100 through the connectors 206 and 216, respectively, at the medium side and connectors 92 and 96 at the digital camera 100 side. The connectors 92 and 96 are connected to interfaces 90 and 94, respectively. The presence or absence of the recording mediums 200 and 210 to be mounted is detected by a recording medium attachment/detachment detection unit 98.

While, according to the present embodiment, the digital camera 100 is described to have two lines of interfaces and connectors to attach the recording medium, an arbitrary number including a singular number of interfaces and connectors can be provided to attach the recording medium to the camera. Further, an interface and connector of different standards may be used for each line. As the interface and the connector, for example, those in compliance with the standards such as a PCMCIA card, or a CF (compact flash®) card can be used.

Further, the interfaces 90 and 94, and the connectors 92 and 96 can be configured using those in compliance with standards such as the PCMCIA card, or the CF card. In this case, various communication cards such as a local area network (LAN) card, a modem card, an USB (universal serial bus) card, an IEEE1394 card, a P1284 card, a SCSI (small computer system interface) card, or a PHS (personal handyphone system) card can be connected. This allows the digital camera 100 and peripheral equipment such as other computers and printers to transmit the image data and management information attached to the image data to each other.

A barrier 102 prevents an image capture unit from being stained or suffering damage by covering the image capture lens 10 of the digital camera 100.

The optical finder 104 is, for example, a TTL finder, and forms an image of a light flux through the lens 10 using a prism and a mirror. By using the optical finder 104, it is possible to perform photographing without using the electronic finder function of the image display unit 28. Further, as described above, within the optical finder 104, the information about a part of the function of the display unit 54 is displayed, such as an in-focus, a camera-shake warning, a flash charging, a shutter speed an aperture value, and an exposure correction.

A communication unit 110 performs various communication processing such as an RS232C, a USB, an IEED1394, a P1284, a SCSI, a modem, a LAN, or a radio communication. A connector (an antenna in case of the radio communication) 112 connects the digital camera 100 to other equipment via the communication unit 110.

FIG. 2 is a perspective view showing an appearance of an exemplary digital camera 100 according to the present embodiment. In FIG. 2, various buttons 201 to 211 are included in the operation unit 70 shown in FIG. 1. A power button 201 gives an instruction to activate and terminate the digital camera 100. A menu button 202 calls out the menu screen so as to perform change of the photographing condition, setting of the date, protection or erasing of the image, and the like. Further, the menu button 202 is used in the case where each of set modes is to be terminated.

A setting button 203 is used to give an instruction to decide the item in a selectable state in the menu screen and the like displayed in the image display unit 28. A display button 204 switches between a display and a non-display of photographing information relating to the image or a display and a non-display of the electronic viewfinder. A left button 205 is used to instruct that the selected item be moved to the left in the menu screen or the like, or the preceding image be played back in the reproducing mode. A right button 206 is used to instruct that the selected item be moved to the right in the menu screen or the like, or the subsequent image be played back in the reproducing mode. Similarly, an up button 207 and a down button 208 are used in the case where the selected item is to be moved up and down.

A shutter button 209 is used to instruct photographing in a photographing mode. A zoom button 210 changes a view angle of the zoom lens, and can slide left and right. According to the sliding direction, the zoom control unit 44 drives the zoom lens, and allows the view angle of the lens to continuously change between a wide angle end and a telescopic end.

A mode changeover switch 211 switches between a photographing mode and a reproducing mode. The image display unit 28, as described above, functions as an electronic viewfinder and a reproducing monitor.

Figure 3:
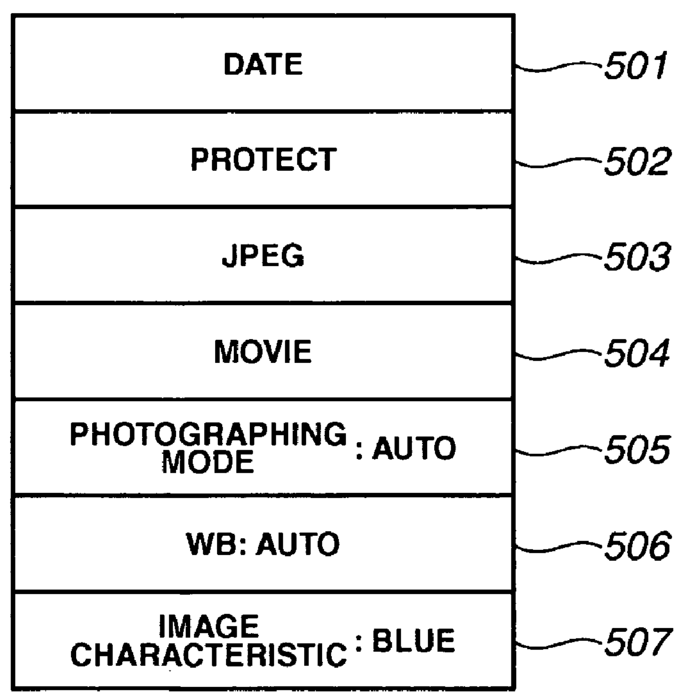
FIG. 3 is a view showing a retrieval key in the first embodiment.

Next, the operation of the digital camera 100 having such a configuration is described with reference to FIGS. 3 to 5. FIG. 3 shows an example of information that can be designated as a retrieval key at the reproducing time in the present embodiment. A DATE 501 is a designated date, and a PROTECT 502 means that a protect attribute of the image is ON. Further, a JPEG 503 means a still image (specifically, an image having an external identifier representing a still image file such as .jpg (JPEG), and .gif (graphic interchange format)). Further, a MOVIE 504 means a moving image (such as .mov, and .mp4,), and a photographing mode: auto 505 means an image captured where the photographing mode is an auto mode. Further, a WB: auto 506 means an image captured where a white balance is an auto mode, and an image characteristic: blue 507 means an image determined to be a blue image.

Among these pieces of the information, with respect to the DATE 501, a designated date input screen (not shown) is displayed in advance, so that a specific date (which may be the year, month and date, or may designate the morning and the afternoon or may include specific time) is allowed to be designated by the user. Further, as the designation of the DATE 501, the fact that the date or the month has been changed (photographing has been made on the date and month different from the preceding image) can be added as a condition, and the elapsed time other than a specific date and hour can be also designated. In the present specification, these pieces of information regarding the time are put together, and are referred to as the date and hour information. The designated date and hour information is, for example, kept stored in the predetermined area of the nonvolatile memory 56.

Figure 4:
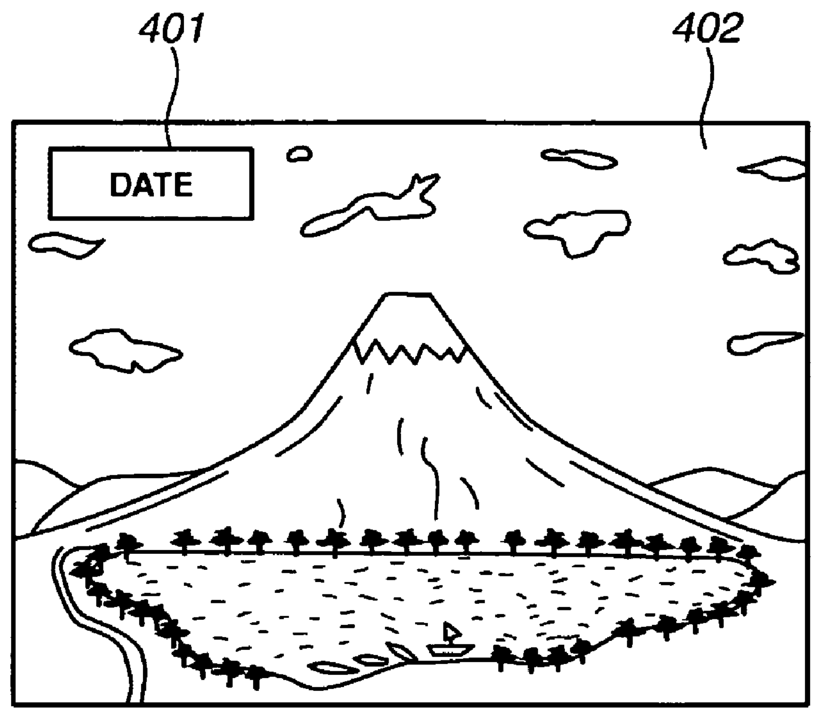
FIG. 4 shows a screen display of the digital camera in a reproducing mode according to the first embodiment.

A retrieval key which is being designated, as shown in FIG. 4, is displayed as a designated retrieval key display 401 on the left above an image 402 which is displayed in the reproducing mode. The retrieval key is changed in a predetermined order every time the up button 207 and the down button 208 are depressed downward in a state shown in FIG. 4, and corresponding to a newly designated retrieval key, the retrieval key display 401 is also renewed. The designated retrieval key is temporarily stored, for example, in the memory 52.

According to the present embodiment, in the case where nothing is particularly designated, the DATE 501 (the photographing made on a different day) is designated by a default as a retrieval key.

Figure 5:
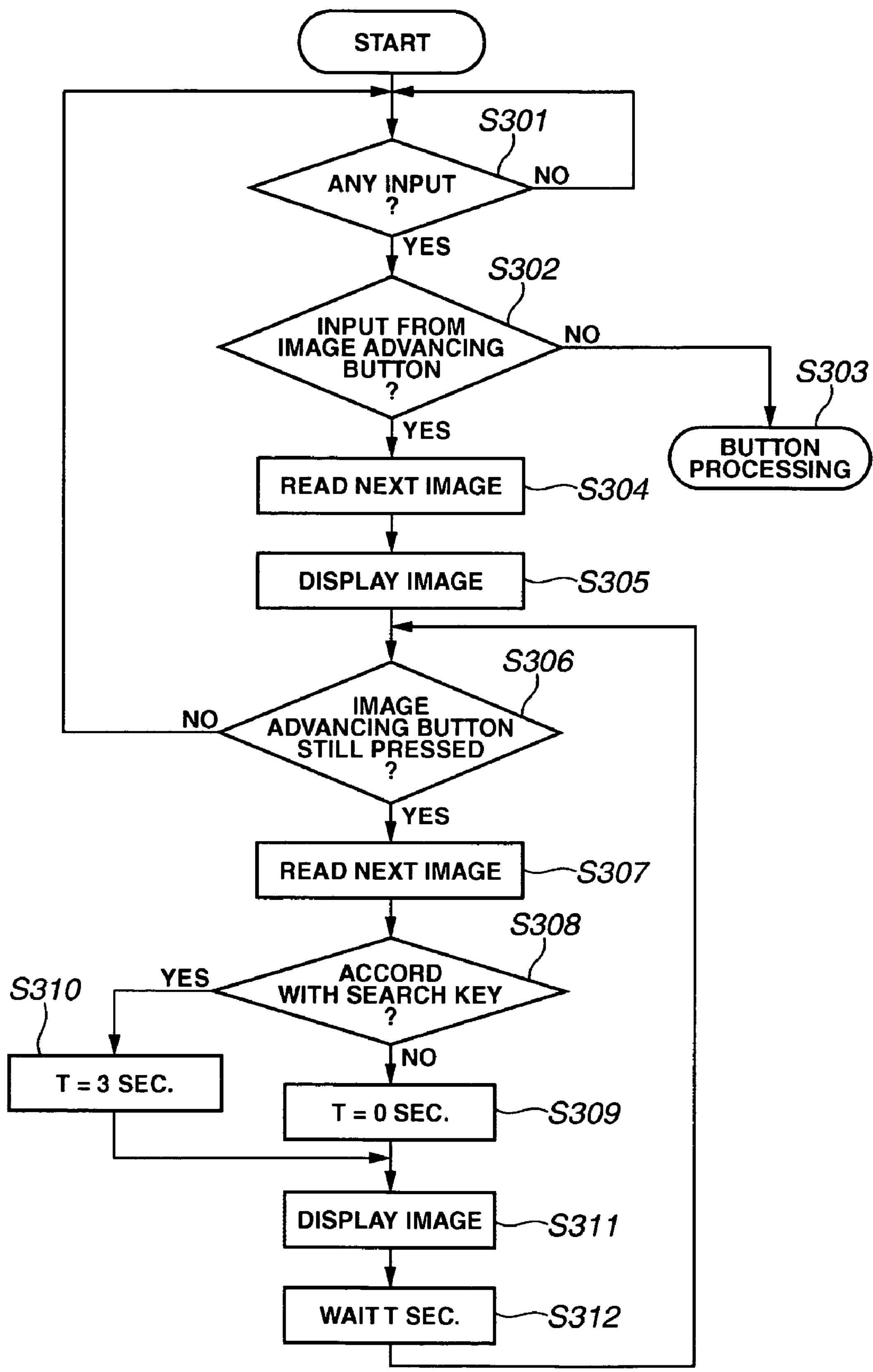
FIG. 5 is a flowchart illustrating an operation of the digital camera in the first embodiment.

FIG. 5 is a flowchart showing a flow of the processing in the reproducing mode of the digital camera 100 according to the present embodiment. This processing, as described above, is executed by the system control unit 50 that controls each component element.

First, the presence or absence of the inputs from various buttons, the mode dial 60, the image display ON/OFF switch 66, the quick review ON/OFF switch 68, and the like shown in FIG. 2 is checked (step S301). In the case where no input is made, processing stays in a waiting state until an input is made. In the case where an input is made, it is determined whether or not the input is an input from the image advancing button (right button 206) (step S302). In the case where the input has not come from the image advancing button, the flow advances to the processing that matches the respective button (step S303). This processing at step S303 includes also a changeover processing of the retrieval key where the up button 207 and the down button 208 are depressed downward. When the changeover processing of the retrieval key is performed, the flow returns to step S301 after the changeover processing is over.

In the case where the input is made from the image advancing button, the image to be displayed next is read from the recording medium 200 or 210 into the memory 30 (step S304). When the reading is completed, the image is transmitted to the image display memory 24, and displayed (step S305). After that, it is determined whether or not the image advancing button is kept depressed (that is, whether or not the input of the image advancing button is continued) (step S306). In the case where the input is not made any more from the image advancing button, the flow returns to an input waiting state of step S301.

On the other hand, in the case where the image advancing button is kept depressed, the reading of the next image is performed (step S307). The information relating to the header information on the image data, the external identifier and the image data such as colors that abound in the image is compared with the retrieval key, and it is determined whether or not the read image accords with the condition of the retrieval key (step S308). In the case where the DATE is designated for the retrieval key, only the initial image that accords with the key is handled as matched. Consequently, in the case where a specific date is designated, only the initial image that was photographed on that date is handled as matched with the key. In the case where the photographing is designated on a different date, a sheet of the image is handled as matched every time the date is changed.

In the case where the image does not accord with the retrieval key, zero second is set as a display waiting time T (step S309). On the other hand, if the image accords with the retrieval key, three seconds are set as the display waiting time T (step S310). Here, while the setting time of step S309 is taken as zero, this time may be 0.5, one second or the like as long as the time is shorter than the time set in step S310. After the display wait time is set (in step S309 or step S310) the image is displayed (step S311), and the processing is in awaiting state for T seconds of the set waiting time (step S312). After that, the flow returns to the processing of step S306 again where it is determined whether or not the image advancing button is kept depressed. During the display of the image that accords with the retrieval key, the retrieval key display 401 is also displayed so that the user can confirm with which retrieval key the image is matched. During the display of the image that does not accord with the retrieval key, the retrieval key display 401 is not displayed, so that the user can not only confirm the difference in the display time, but also can easily confirm whether or not the image accords with the retrieval key by the presence or absence of the retrieval key display 401.

While only the depressing downward of the image advancing button (right button) 206 has been described with reference to FIG. 5, with respect to the image return button (left button 205), the same processing can be performed except that a reading order of the image is reversed. When the processing reaches the first or the last image, the image may be read in order as it is from the last or the first one.

As described above, the digital camera of the present embodiment, when playing back and displaying the image recorded in the recording medium, sets a waiting time longer for the image matching the designated retrieval key than the other images. This allows the user to easily find the desired image even if a large amount of images are recorded.

Further, the display waiting time is controlled in consideration of the retrieval key only when the input is continuously made by the image feeding key or the image returning key, so that a display unintended by the user can be prevented.

Second Embodiment

The images captured by a digital camera very often continue to appear in the same photographing condition and the same date. If the images captured in such same condition are regarded as a group, in order to easily perform the retrieval of the image, it is useful to display the image in which parameters at the photographing time such as the photographing condition, and the date and time or the entire color shade vary.

Based on such consideration, a feature of the present embodiment is that a display waiting time is controlled depending on whether or not a retrieval key of the image is changed from the preceding image.

Figure 6:
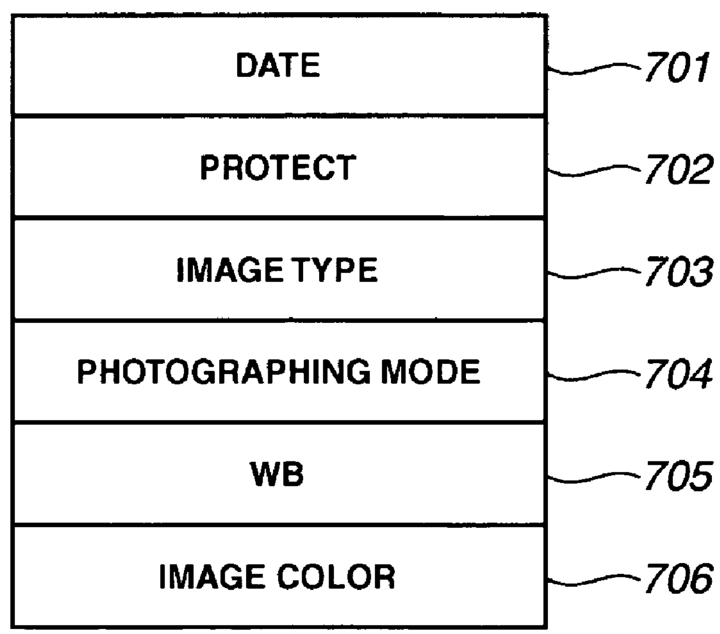
FIG. 6 is a view showing the retrieval key in a second embodiment.

FIG. 6 shows an example of a retrieval key used in the present embodiment. A DATE 701 means a changing point of date, and a PROTECT 702 means that a changing point of a protect attribute of the image is taken as the retrieval key. Further, an image type 703 means a changing point of the image type such as a still image and a moving image, and a photographing mode 704 means that a changing point of the photographing mode such as a manual mode and an auto mode is taken as the retrieval key. Further, a WB 705 means a changing point of the white balance setting at the photographing time, and an image color 706 means that a changing point of colors that characterize the image is taken as the retrieval key. FIG. 6 shows that these changing points are taken as the retrieval keys, respectively, and the display time of the images in which the retrieval keys change is varied.

According to the present embodiment, with respect to the DATE 701, a designation screen (not shown) is displayed in advance, so that a stage or a condition which is taken as the change of the date and time information such as the year, the month and the day (the morning and the afternoon may also be designated) is designated by the user. According to the present embodiment, if there is no particular designation, similarly to the first embodiment, the DATE (day) is designated by a default as the retrieval key.

Figure 7:
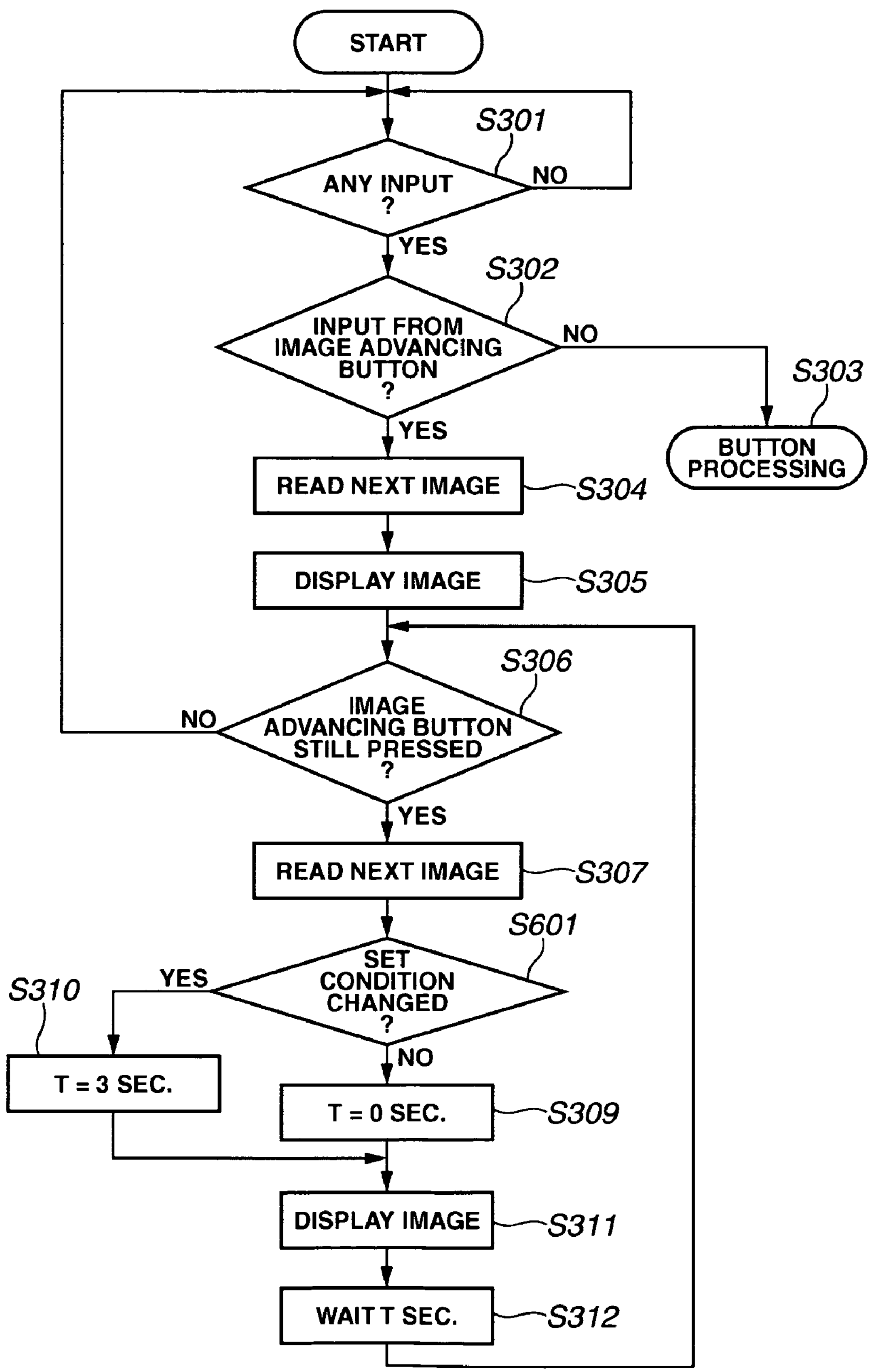
FIG. 7 is a flowchart illustrating an operation of the digital camera in the second embodiment.

FIG. 7 is a flowchart to explain the operation of the digital camera 100 in the reproducing mode serving as an image processing apparatus in the present embodiment. The same reference numerals are attached to the same processing as FIG. 5. In this manner, according to the present embodiment, the same processing as the first embodiment may be performed except that the determination processing at step S308 in FIG. 5 is changed to the determination processing at step S601.

At step S601, by comparing the information on the image (for example, those stored in the memory 52) that does not corresponds to the retrieval key (setting condition) with the information corresponding to the read image, it is determined whether or not the setting condition is changed. If the setting condition is changed, at step S310, the display waiting time T is set to three seconds, and if the setting condition is not changed, the display waiting time T is set to zero second at step S309.

In this manner, the digital camera of the present embodiment is controlled such that a display waiting time for the image that changes from the preceding image relating to the designated information becomes longer than the image that does not change. Accordingly, it becomes easy to find the beginning of the image group that satisfies the same condition, for example, such as the image captured on the same date, and find out the desired image from among a large amount of images.

Third Embodiment

The type of the retrieval key of the second embodiment, similarly to the first embodiment, has been changed in the predetermined order every time the up button 207 and the down button 208 on FIG. 2 were depressed. In the present embodiment, an example where the retrieval key selection function of this cross button is effectively used will be described.

Figure 8:
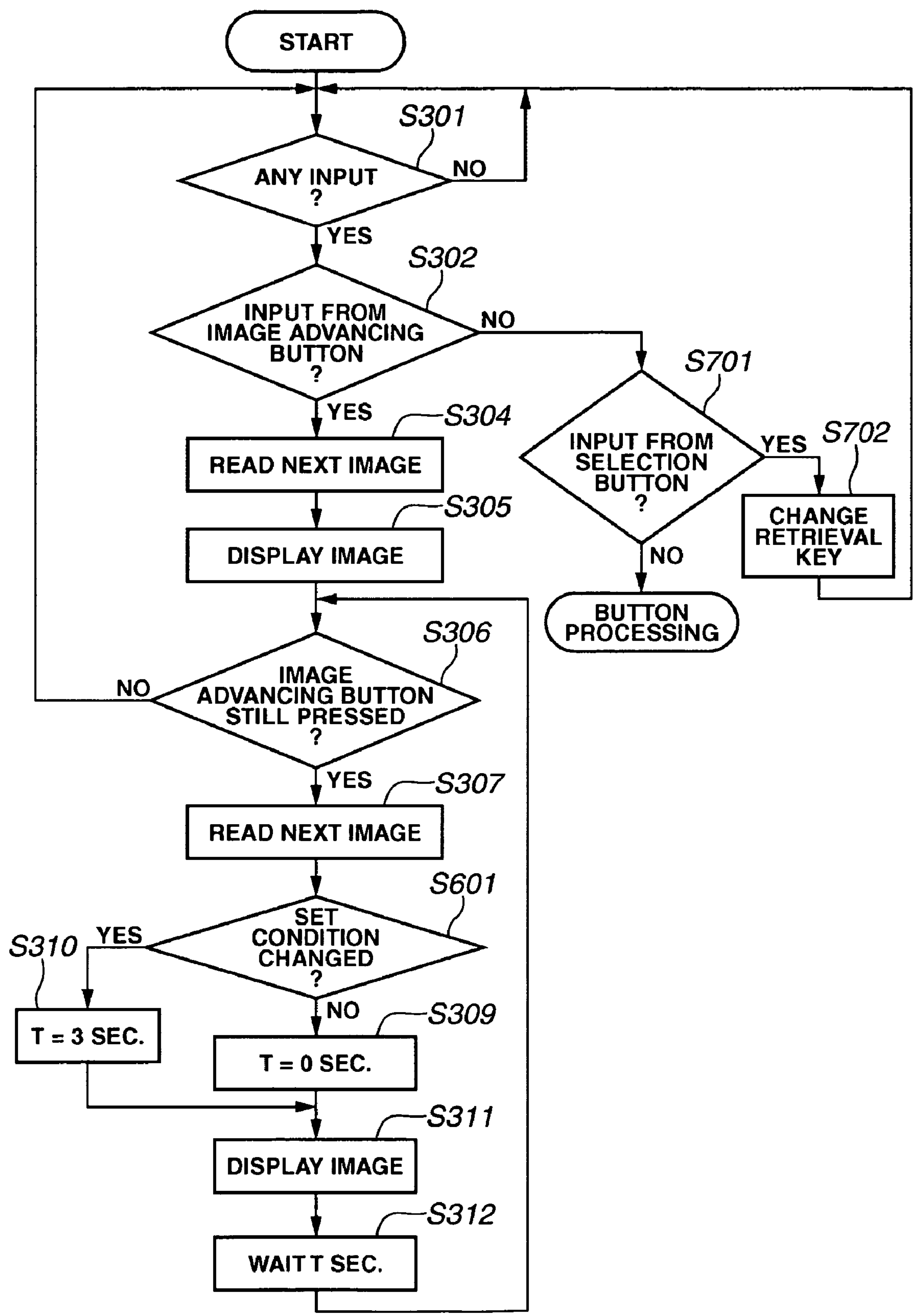
FIG. 8 is a flowchart illustrating an operation in the reproducing mode of a digital camera as an image processing apparatus in a third embodiment.

FIG. 8 is a flowchart illustrating an operation in the reproducing mode of a digital camera 100 as an image processing apparatus in the present embodiment. The same reference numerals are assigned to the same processing as in FIG. 7. In the present embodiment, the processing may be the same as the first embodiment except that the processing in the case of NO at step S302 of FIG. 7 is changed to depressing of the up and down buttons of the cross button.

At step S701, it is determined whether or not the input is made by the up and down buttons of the cross button, that is, the selection buttons of the retrieval key. Here, if the input is made by the buttons other than the selection buttons, the corresponding button processing is performed.

At step 701, in a case where it is determined that the input is made by the selection buttons (up and down buttons), the key is changed to a retrieval key changed by the depressing of the buttons (step S702). After performing this change, the change of the condition is determined based on the retrieval key after the change in the determination processing at step S601. A specific example of the retrieval based on the flowchart of FIG. 8 will be described below.

First, at an initial setting, since the type of the retrieval key is a changing point of a date, DATE 701, the image advancing processings at steps S306 to S312 continue in accordance with the depressing of the right button 206 by the user.

Here, for example, assume that ten sheets of images dated Aug. 15, 2005 and twenty sheets of images dated Sep. 1, 2005 are stored while the image advancing is performed in that order, and the image searched by the user is an image dated Sep. 1, 2005.

In this case, a front image which is dated Sep. 1, 2005, that is, the eleventh image is displayed for three seconds at step S310, and during that time, the user releases the right button 206. According to this operation by the user, it is determined NO at the next step S306, and the flow does not advance to the next image reading, but returns to step S301.

In the present embodiment, subsequent to this step, the user can perform the image advancing under other conditions. For example, in the above state, the user can depress the upper and lower buttons to select the type of the retrieval key, e.g., MOVIE 504 (steps S302 and S701). When the retrieval key is changed (step S702), the image advancing of steps S306 to S312 are performed from the eleventh image (the front image dated Sep. 1, 2005) with the MOVIE 504 taken as a key.

By performing the multi-stage retrieval processing as described above using plural keys, the user can narrow down a retrieval to find out the moving image dated Sep. 1, 2005.

The retrieval of the present embodiment is different from the prevailing retrieval technology in that display images are changed by the image advancing in real time. If the cross button as shown in FIG. 2 is used, the operability of the retrieval can be greatly improved. That is, by using the cross key (right 206, left 205, up 207 or down 208), the user can intuitively and quickly execute the operation such as forwarding and stopping the image advancing, and changing the type of the retrieval key.

In the present embodiment, while an example of the two stage processing of the date and the moving image has been shown, it is obvious from the flowchart of FIG. 8 that the retrieval of three stages or more using other keys such as image colors can be performed. Further, the cross button used in the operation is not limited to a button configured to have four independent members as shown in FIG. 2, but may be configured to have one member integrally constructed by four direction buttons.

Other Embodiments

In the above described embodiments, only the changing of the display method of the image satisfying the condition represented by the retrieval key and the image not satisfying the condition has been described. However, when displaying the image satisfying the condition, information may be given to that effect, for example, by the voice from the speaker included in the display unit 54.

If all the images recorded in the recording medium do not satisfy the retrieval key, the user may be notified to that effect by a message and the like together with the retrieval key, which prevents permanent fast-forwarding of images which do not accord with the retrieval key.

Further, in the above described embodiments, the display waiting time of the image that satisfies the condition represented by the retrieval key is made longer than the image that does not satisfies the condition. However, it is possible that the display waiting time of the image not satisfying the condition is made shorter by inverting the logic of the condition.

While the display waiting time to be set is two types in the above described embodiment, it may be three or more types. In that case, the display waiting time may be configured to be associated with each level based on how the image accords with the condition. For example, the display waiting time may depend on the case where the image completely accords with the condition designated by the retrieval key, or the case where only the portion of the image accords with or its value comes near the condition, or the case where the image does not accord with the condition in the least or its value is far away from the condition. Further, apart from the display time, a thumbnail display and a full size image display can be considered. That is, the image satisfying the condition may be displayed in high resolution or in a large size, and the image not satisfying the condition may be displayed in a low resolution of the thumbnail image or in a small size. In this case, when the thumbnail image is already included in the image data, it is used, and when it is not included therein, the system control circuit 50 may generate the thumbnail image to be transmitted to the image display memory 24.

Further, in the above description, the image display ON/OFF switch 66 and the quick review ON/OFF switch 68 have been independently configured, respectively. However, there is no problem if the image display ON/OFF switch 66 and the quick review ON/OFF switch 68 are integrally constructed to become a combined switch. In this case, the switch can be configured to include three positions, i.e. an image display ON/an image display ON only for quick review/an image display OFF.

Further, while, according to the above description, the recording mediums 200 and 210 have been configured to be detachable/attachable to the digital camera 100, some or all of the recording mediums may be configured to be fixed to the image processing apparatus 100. Further, a single or an arbitrary number of the recording medium 200 or 210 may be configured to be connectable to the camera.

Furthermore, the program of software realizing the functions of the above described embodiment may be supplied to the image processing system or the device which has a computer capable of executing the program, directly from the recording medium or by using wired/radio communications. In this case, the computer of that system or device executes the supplied program, thus achieving the functions equivalent to the present invention.

Consequently, program code itself, which is supplied and installed in the computer to enable the computer to realize the function of the present invention, also realizes the present invention.

In that case, if the program function exists, the format of a program does not matter whether it is object code, a program executed by an interpreter, script data supplied to an operating system (OS), and the like.

As the recording medium which supplies the program, there are, for example, a flexible disc, a hard disc, a magnetic recording medium such as a magnetic tape, and the like. Further, as other recording mediums, there is, for example, an optical/magnetic optical recording medium such as magneto-optical (MO), compact disk read-only memory (CD-ROM), CD-recordable (CD-R), CD-rewritable (CD-RW), digital versatile disk-ROM (DVD-ROM), DVD-R, or DVD-RW, and a nonvolatile semiconductor memory.

As the supply method of the program using wired/radio communications, for example, the computer program itself forming the present invention can be stored in the server on a computer network. Alternatively, a data file (program data file) that can be the computer program forming the present invention on a client computer network, such as a compressed file that includes an automatic installation function can be stored. Then, to the client computer that has been connected, the program data file is downloaded. In this case, it is also possible to divide the program data file into plural segment files, and install the segment files in different servers.

That is, a sever device, which allows plural users to download the program data file may be used for realizing the function of the present invention by the computer.

Further, the program of the present invention may be enciphered so as to be stored in the recording medium such as CD-ROM and the like, and distributed to the user. In this case, the user who satisfies the predetermined condition is allowed to download the key information to cipher the encryption, for example, from the home page through the internet. The enciphered program is executed using the key information, and installed into the computer.

Through the execution of the read program by the computer, the functions of the above described embodiments are realized. In addition, based on the instruction of the program, the OS and the like operating on the computer can perform a part or the whole of the actual processing so as to realize the functions of the above described embodiments.

Further, the program read from the recording medium may be written in the memory which is provided in the feature expansion board inserted into the computer or the feature expansion unit connected to the computer. In this case, after the program is written, based on the instruction of the program, the CPU and the like provided in the feature expansion board or the feature expansion unit can perform a part or the whole of the actual processing to realize the functions of the above described embodiments.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims priority from Japanese Patent Application Nos. 2004-324074 filed Nov. 8, 2004 and 2005-291293 filed Oct. 4, 2005, which are hereby incorporated by reference herein in their entirety.

What is claimed is:

1. A display control apparatus comprising:

a reading unit configured to read an image recorded in a recording medium;

a display unit configured to display the read image;

an instruction detection unit configured to detect a changeover instruction to change the displayed image to a next image; and a control unit that allows the reading unit to read the image and the display unit to perform the display in order when the instruction detection unit continuously detects the changeover instruction, and that changes the display performed by the display unit depending on whether the read image satisfies a predetermined condition, wherein the control unit processes the read image so that at the display unit a display size or resolution of a read image satisfying the predetermined condition becomes larger than a read image not satisfying the predetermined condition.

2. The display control apparatus according to claim 1, wherein the control unit is configured to control the display unit so that at the display unit the display time of the read image satisfying the predetermined condition becomes longer than the display time of the read image that does not satisfy the predetermined condition.

3. The display control apparatus according to claim 1, wherein the predetermined condition is a condition with respect to information obtained from the image recorded in the recording medium or information obtained at a photographing time.

4. The display control apparatus according to claim 1, wherein the predetermined condition is that information to be obtained from the image recorded in the recording medium or information having been obtained at a photographing time has changed from information corresponding to an image previously displayed.

5. A display control method comprising:

a reading step of reading an image recorded in a recording medium;

a display step of displaying the read image;

an instruction detection step of detecting a changeover instruction to change a display image to a next image; and a control step of allowing the reading of the image by the reading step and performing the display of the read image by the display step in order when the instruction detection step continuously detects the changeover instruction, and changing a display at the display step depending on whether the read image satisfies the predetermined condition, wherein the control step processes the read image so that at the display step a display size or resolution of a read image satisfying the predetermined condition becomes larger than a read image that does not satisfy the predetermined condition.

6. The display control method according to claim 5, wherein the control step controls the display step so that at the display step a display time of the read image satisfying the predetermined condition becomes longer than a display time of the read image that does not satisfy the predetermined condition.

7. The display control method according to claim 5, wherein the predetermined condition is a condition with respect to information obtained from the image recorded in the recording medium or information having been obtained at a photographing time.

8. The display control method according to claim 5, wherein the predetermined condition is that information obtained from the image recorded in the recording medium or information having been obtained at a photographing time has changed from information corresponding to an image previously displayed.

* * * * *